(12) United States Patent
Lu

(10) Patent No.: US 11,931,651 B2
(45) Date of Patent: Mar. 19, 2024

(54) GRAPHICAL USER INTERFACE FOR ELECTRONIC GAMES

(71) Applicant: Garena Online Private Limited, Singapore (SG)

(72) Inventor: Chen Lu, Singapore (SG)

(73) Assignee: Garena Online Private Limited, Singapore (SG)

( * ) Notice: Subject to any disclaimer, the term of this patent is extended or adjusted under 35 U.S.C. 154(b) by 170 days.

(21) Appl. No.: 17/764,810

(22) PCT Filed: Dec. 3, 2021

(86) PCT No.: PCT/SG2021/050747
§ 371 (c)(1),
(2) Date: Mar. 29, 2022

(87) PCT Pub. No.: WO2022/211721
PCT Pub. Date: Oct. 6, 2022

(65) Prior Publication Data
US 2023/0080907 A1   Mar. 16, 2023

(30) Foreign Application Priority Data
Apr. 1, 2021 (SG) .......................... 10202103346X

(51) Int. Cl.
*A63F 13/533* (2014.01)
*A63F 13/537* (2014.01)
*A63F 13/837* (2014.01)

(52) U.S. Cl.
CPC .......... *A63F 13/533* (2014.09); *A63F 13/537* (2014.09); *A63F 13/837* (2014.09);
(Continued)

(58) Field of Classification Search
None
See application file for complete search history.

(56) References Cited

U.S. PATENT DOCUMENTS

2012/0270617 A1* 10/2012 Reed ........................ A63F 13/57
  463/8
2013/0288759 A1* 10/2013 Rom ........................ A63F 13/61
  463/7

(Continued)

*Primary Examiner* — Jason T Yen
(74) *Attorney, Agent, or Firm* — David R. Stevens; Stevens Law Group

(57) ABSTRACT

A graphical user interface for electronic games is disclosed. The interface comprises a current weapon panel configured to display a first weapon in an active state, and a plurality of spare weapon panels configured to display weapons in the inactive state. The plurality of spare weapon panels is arranged in accordance with the panel ranking values assigned to each spare weapon panel. The selection of any one of the spare weapon panels results in a corresponding weapon in the inactive state, which is displayed on the selected spare weapon panel, being switched to the active state and promoted to the current weapon panel, and the first weapon being switched to the inactive state and relegated to a spare weapon panel. The weapons in the inactive state are dynamically ordered and displayed on the plurality of spare weapon panels according to the panel ranking value of the spare weapon panels and the predicted weapon ranking value.

16 Claims, 7 Drawing Sheets

(52) U.S. Cl.
CPC ... *A63F 2300/303* (2013.01); *A63F 2300/308* (2013.01); *A63F 2300/8076* (2013.01)

(56) References Cited

U.S. PATENT DOCUMENTS

| | | | |
|---|---|---|---|
| 2016/0192067 A1* | 6/2016 | Obana | A63F 13/92 381/334 |
| 2017/0282076 A1* | 10/2017 | Tsui | A63F 13/35 |
| 2019/0366213 A1* | 12/2019 | Zhou | A63F 13/533 |

* cited by examiner

GRAPHICAL USER INTERFACE FOR ELECTRONIC GAMES

FIELD OF THE INVENTION

The invention pertains to user interfaces, and in particular, graphical user interfaces for electronic games.

BACKGROUND

Electronic games have generally been played on video game consoles or personal computers using traditional input devices such as gamepads, joysticks, mice, and keyboards. Many electronic games can be considered shooter games, in which game play includes aiming and firing a weapon at a target such as an enemy or other objects within the virtual game environment. Examples include first-person shooters and third-person shooters, which may encompass combat simulation games, flight or vehicle simulation games, and other avatar driven games.

With the proliferation of touchscreen-based electronic devices such as tablets, smartphones, portable media players, touch-enabled laptops, and personal digital assistants (PDAs), users are increasingly playing shooter games using a touchscreen as the user interface to control the actions of an avatar in the virtual game environment. For example, the touchscreen interface may include one set of touch-sensitive controller inputs configured to enable the user to control the avatar's movement (e.g., forwards, backwards, turning left and right, picking up and dropping weapons, etc.), and another set of touch-sensitive controller inputs configured to enable the user to perform weapons-related functions (e.g., use or fire a weapon, reload the ammunition of a weapon, and/or switch weapons).

Generally, a user playing shooter games may reload the current weapon in use, or change the weapon in use by selecting from one or more other weapons equipped by the avatar (the weapons in which the avatar is in possession of), by operating specific touchscreen inputs to perform the desired weapons-related functions. Because a touchscreen interface includes a variety of controller inputs to provide the user with a significant degree of control in shooter games, and each weapon equipped by the avatar are typically represented by a different controller input to enable weapon switching, having an increasing number of equipped weapons would correspondingly increase the number of controller inputs on the touchscreen interface, thereby undesirably increasing the complexity of the user's interaction with the touchscreen interface. For example, each equipped weapon is constantly or permanently associated to a different static controller input deployed at different locations on the touchscreen interface, thus requiring the user to perform touching operations on different points of the touchscreen interface each time weapon switching is desired. Consequently, the more "spare weapons" there are to choose from, the more tedious and cumbersome it will be to operate the controller inputs associated to the weapons. This is compounded by the fact that touchscreen inputs on mobile devices are usually small and close to one another, making selection of the inputs an arduous task requiring a high level of dexterity and pinpoint accuracy. This is one of the primary reasons why shooter games tend to limit the spare weapons to one or two.

Although some shooter games have restricted the number of spare weapons to one or two in order to simplify the user interface on a touchscreen, this restriction inevitably limits the options of how users can play the game and thus reduces the entertainment value of the shooter game.

What is thus required is a novel graphical user interface which addresses the above problems by dynamically sorting the spare weapons (i.e. equipped weapons not in use by the avatar) into specific positions and in accordance with a predicted relative likelihood that each of the equipped weapons will be selected for use, thus enabling a user to more easily and efficiently perform weapon switching in an electronic game using a touchscreen device. Furthermore, other desirable features and characteristics will become apparent from the subsequent detailed description and the appended claims, taken in conjunction with the accompanying drawings and this background of the disclosure.

SUMMARY OF INVENTION

According to a first aspect of the present invention, a user interface for electronic games is described, the user interface comprising a weapons-display region configured to display weapons of an avatar. Each of the weapons are capable of being in an active state or an inactive state, and each of the weapons are assigned with a predicted weapon ranking value corresponding to a predicted relative likelihood that the particular weapon will be selected for use. The weapons-display region comprises a current weapon panel configured to display a first weapon of the weapons in an active state, and a plurality of spare weapon panels configured to display one of the weapons in the inactive state at any one time to reflect that the displayed weapon is not currently in use. Each of the plurality of spare weapon panels is assigned with a panel ranking value, which reflects a significance or importance of a positioning of each spare weapon panel relative to other spare weapon panels in the weapons-display region. The plurality of spare weapon panels are arranged in accordance with the panel ranking values. In some embodiments, the selection of any one of the spare weapon panels results in a corresponding weapon in the inactive state, which is displayed on the selected spare weapon panel, being switched to the active state and promoted to the current weapon panel in place of the first weapon to reflect that the corresponding weapon is currently in use. At the same time, the first weapon is switched to the inactive state and relegated to a spare weapon panel. The weapons in the inactive state, including the relegated first weapon, are dynamically ordered and displayed on the plurality of spare weapon panels according to the panel ranking value of the spare weapon panels and the predicted weapon ranking value, wherein the corresponding weapon currently in use is not displayed on the plurality of spare weapon panels.

Preferably, the current weapon panel is positioned adjacent to at least one of the plurality of spare weapon panels.

Preferably, the current weapon panel is positioned adjacent to and directly above each of the plurality of spare weapon panels.

Preferably, the weapon in the inactive state assigned with the highest predicted weapon ranking value is mapped to the spare weapon panel assigned with the highest panel ranking value.

Preferably, the weapon in the inactive state assigned with the lowest predicted weapon ranking value is mapped to the spare weapon panel assigned with the lowest panel ranking value.

Preferably, the first weapon is a ranged weapon, and selection of the current weapon panel results in the ranged weapon, which is in an active state and displayed on the current weapon panel, being reloaded with ammunition.

Preferably, the current weapon panel is positioned adjacent to the spare weapon panel assigned with the highest panel ranking value, wherein a user's area of operation for performing both weapon switching and weapon reloading functions is reduced to a small area of the user interface when the spare weapon panel assigned with the highest panel ranking value is selected.

Preferably, a higher panel ranking value of the spare weapon panel reflects a greater accessibility of the spare weapon panel.

Preferably, a higher panel ranking value of the spare weapon panel reflects a closer proximity of the spare weapon panel to the current weapon panel.

Preferably, the weapons of the avatar comprises at least one primary weapon, at least one secondary weapon, and at least one melee weapon.

Preferably, the at least one primary weapon is assigned with a higher predicted weapon ranking value relative to the at least one secondary weapon and the at least one melee weapon Preferably, the at least one secondary weapon is assigned with a higher predicted weapon ranking value relative to the at least one melee weapon.

Preferably, the weapons-display region comprises more than two spare weapon panels.

Preferably, the user interface is a graphical user interface rendered and presented on a touch-sensitive display screen of an electronic device.

According to a second aspect, the present invention provides a system comprising one or more computers and one or more storage devices storing computer-readable instructions that, when executed by the one or more computers, cause the one or more computers to generate and render all aspects of any of the above-described user interfaces. The same applies to one or more non-transitory computer storage media storing instructions that, when executed by one or more computers, cause the one or more computers to generate and render any of the above-described user interfaces. The user interface can thus be easily transferred to other game systems and operated there.

Other aspects of the invention will become clearer from the following detailed description of some preferred embodiments thereof.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Figure 1A:
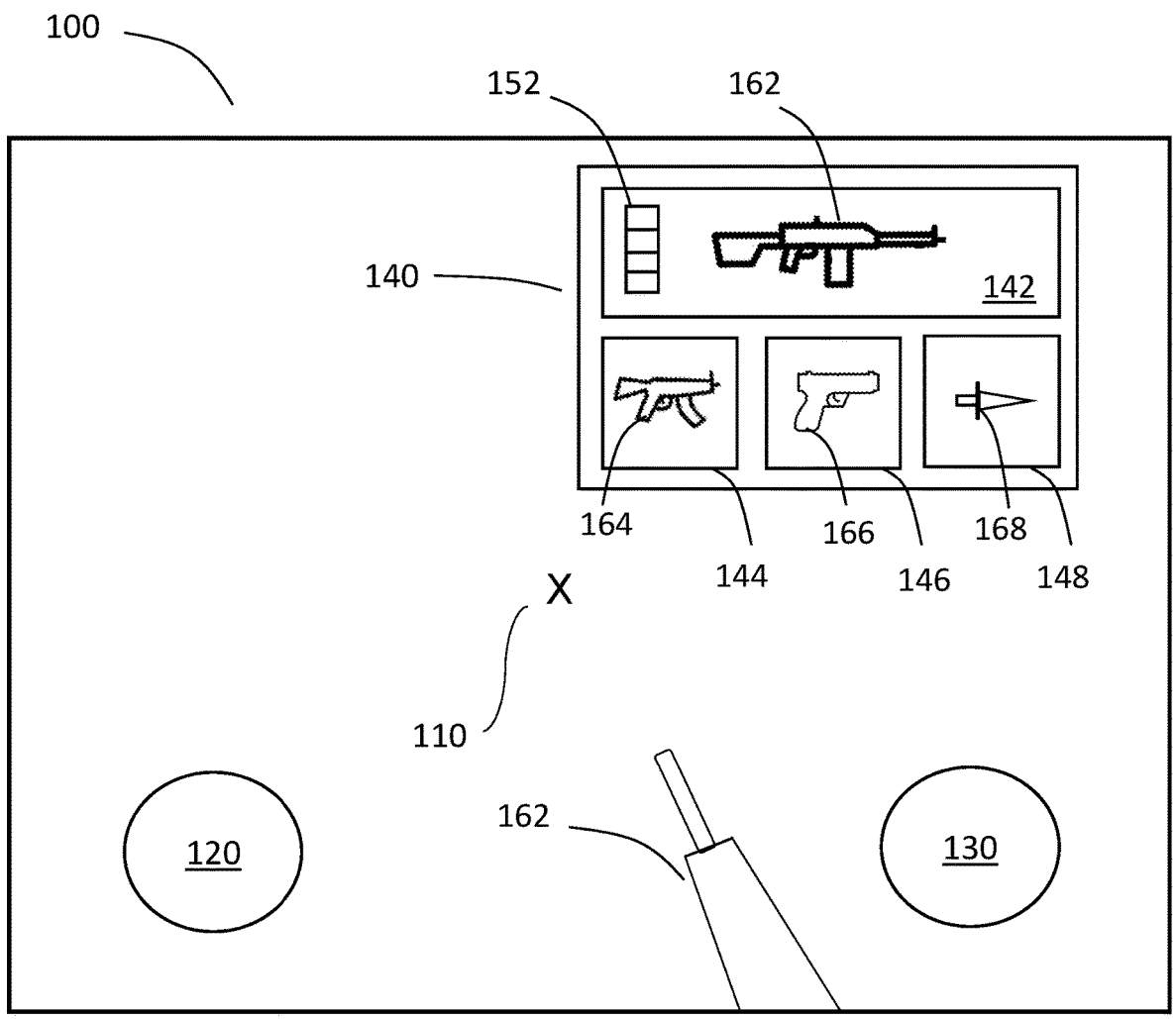
FIGS. 1a-1d show a graphical user interface rendered on a display screen of an electronic device, in accordance with certain embodiments.

Skilled artisans will appreciate that elements in the figures are illustrated for simplicity and clarity and have not necessarily been depicted to scale. For example, the dimensions of some of the elements in the block diagrams or steps in the flowcharts may be exaggerated relative to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a graphical user interface for electronic games, the graphical user interface comprising a weapons-display region configured to display selectable weapons of an avatar. Each of the selectable weapons is assigned with a predicted weapon ranking value corresponding to a predicted relative likelihood that the particular weapon will be selected for use. The weapons-display region includes a current weapon panel and a plurality of spare weapon panels. The current weapon panel is configured to dynamically display a first selectable weapon in an active state. Each of the plurality of spare weapon panels is assigned with a panel ranking value that reflects the significance (or importance) of the positioning of each spare weapon panel relative to other spare weapon panels in the weapons-display region, and the plurality of spare weapon panels are arranged in accordance with the panel ranking values. The spare weapon panels are configured to dynamically display selectable weapons in an inactive state.

In some embodiments, selection of any one of the spare weapon panels of the graphical user interface as described herein results in the corresponding selectable weapon in the inactive state, which was displayed on the selected spare weapons panel, being switched to the active state and promoted to the current weapons panel in place of the first selectable weapon to reflect that the corresponding selectable weapon is currently selected for use and is "active". At the same time, the first selectable weapon is switched to the inactive state and relegated to a spare weapon panel to reflect that the first selectable weapon is currently one of the selectable weapons in the inactive state. The selectable weapons currently in the inactive state (i.e. spare weapons) are dynamically ordered and displayed on the plurality of spare weapon panels according to the panel ranking value of the spare weapon panels and the predicted weapon ranking value of the selectable weapons currently in the inactive state.

Thus, the graphical user interface dynamically arranges the positioning and order in which the spare weapons of an avatar are displayed to display the most "likely used" spare weapon on a relative "prime location" of the graphical user interface. This simplifies the user's interaction with the user interface during weapon switching. For example, the inactive spare weapon with the highest predicted weapon ranking value is mapped (or associated) to the spare weapon panel with the highest panel ranking value to allow users to intuitively interact with the spare weapon panels to perform the weapon switching function. The most "likely used" inactive weapon may be, for example, displayed on a "leftmost" spare weapon panel. For example, the leftmost selectable panel may be predetermined as the most easily accessible (or the most ideally positioned) spare weapon panel since there is no other spare weapon panel to the left of it. In this embodiment, it would be easy for the user to navigate a mouse, or perform a touching operation, to select the "leftmost" spare weapon panel as the user would not need to be concerned with accidentally pressing a button or providing any unintended input on the left side of the leftmost spare weapon panel.

In comparison, a "middle" spare weapon panel (i.e., a spare weapon panel sandwiched between two other spare weapon panels) would require a relatively higher degree of precision from the user to operate so as to avoid selecting the other spare weapon panels to the right and left of the "middle" spare weapon panel. The graphical user interface as described herein advantageously optimizes the order and position of the spare weapons to allow the user to easily switch to the desired weapon in most instances even when the user has more than two spare weapons to choose from as the invention will intuitively arrange the most "likely used" spare weapon in the "optimal position" to be selected by the user.

Furthermore, in some additional embodiments, the graphical user interface as described herein is configured to position the current weapon panel, which is configured to perform weapon reloading function, adjacent to one or more of the spare weapon panels, which are configured to perform weapon switching function. In this case, the most "likely used" inactive weapon may be, for example, displayed on a spare weapon panel closest to the current weapon panel to allow the user to operate within a small region of the user interface to perform both weapon switching and weapon reloading functions. This configuration of inputs is particularly beneficial for users seeking to easily and quickly reload the most "likely used" weapon after switching to that weapon.

FIGS. 1a-1d show a graphical user interface 100 in accordance with certain embodiments. The graphical user interface (hereinafter "interface") 100 corresponds to a game being played on an electronic device. In some embodiments, the interface 100 is rendered on a display screen on the electronic device. In a non-limiting example, the interface 100 is rendered and presented on a touch-sensitive display screen on the electronic device. The display screen may be, for example, a multi-touch sensitive screen capable of sensing and detecting touching (or swiping) operations performed by the user on multiple locations of the screen simultaneously. For example, the user may operate a selectable graphical element of the interface 100 by performing a touching operation on the selectable graphical element. The skilled person would also appreciate that the interface 100 may also be rendered and presented on a traditional non-touch display screen. In such case, traditional input devices including, but not limited to, gamepads, mice, and keyboards may be used to operate the selectable graphical elements of the interface 100. The interface 100 may be rendered on the display screen when a software product corresponding to the game is executed on one or more computing hardware of the electronic device.

In some embodiments, the game corresponds to a shooter game, and the game environment rendered on the display screen may be a game level or world associated with shooter games. For example, the game environment may be displayed from a game viewpoint relative to the user's avatar (e.g., first-person viewpoint or third-person viewpoint). For the purpose of explaining the disclosure, the depicted game viewpoint in FIGS. 1a-1d correspond to a first-person viewpoint. In some embodiments, the game environment may be displayed on any suitable electronic device that incorporates a multi-touch sensitive display screen, such as but not limited to a smart phone, a tablet computer, a desktop computer, and a laptop computer. As the user moves the avatar through the game environment, the display of the game environment may be adjusted to reflect the changes around the user's avatar.

In some embodiments, the interface 100 includes a crosshair 110 that the user may use to aim a weapon (e.g., gun or dagger) at a target in the game environment. For example, the crosshair 110 is centrally located on the display screen and functions as an aiming indicator. Although the crosshair is depicted in an 'x' configuration, it is appreciated that the crosshair 110 may also be a circle, a bullseye, a coloured display, a cross, or some other visual indicia displayed on the display screen.

The interface 100 includes a plurality of graphical elements configured to provide the user with selectable inputs to play the shooter game. For example, a user uses his/her thumbs and/or fingers and selectively performs touching operations on one or more selectable graphical elements of the interface 100. The interface 100 senses the user's touching operations, and the software product corresponding to the game executes a set of machine readable instructions to perform in-game actions pertaining to the selected graphical element(s) of the interface 100.

In some embodiments, the interface 100 includes a first selectable graphical element (hereinafter "first input element") 120 associated with a set of manipulation inputs for moving the crosshair 110. For example, the user may perform touching operations on the first input element 120 and manipulate the first input element 120 in different directions to move the crosshair 110 to different positions in the game environment. The first input element 120 is, for example, a virtual joystick. In some embodiments, the crosshair may be moved freely about the display screen without adjusting the game viewpoint. For example, the first input element 120 may be configured to aim the crosshair 110 at a target by moving the crosshair vertically and horizontally across the display screen. In other embodiments, the crosshair 110 may be locked to the centre of the display screen. For example, the first input element may be configured to pan the game viewpoint with the crosshair maintained at the centre of the game viewpoint.

In some embodiments, the interface 100 includes a second selectable graphical element (hereinafter "second input element") 130 associated with a firing input for performing an attack action in the game environment with a weapon equipped by the avatar. As used herein, the term "weapon equipped by the avatar" refers to any weapon that is currently carried by the avatar and available for selection as an active weapon by the user, and includes the weapon currently selected by the user. The term "active weapon" refers to any weapon in an active state and is currently in use by the avatar. For example, the user may perform touching operations on the second input element 120 to trigger, use, or "fire" an active weapon. The second input element 120 is, for example, a virtual button. The attack action, which includes shooting a projectile from a firearm (e.g., rifle, submachine gun, pistol) and thrusting a dagger, is directed towards the position of the crosshair 110.

During game play, the user may equip the avatar with a variety of weapons provided in the game. These weapons may be divided into various subcategories based on firepower (or rate of damage), weapon class, weapon type, frequency of use, or a combination thereof. The rate of damage of a particular weapon may be defined by the 'per shot damage' (hereinafter "base damage") and rate of fire of the weapon. In some embodiments, the weapons may be categorized as a primary weapon, secondary weapon, or melee weapon based on each weapon's predicted frequency of use (or usage frequency). Primary weapons may include a predetermined group of ranged weapons that are predicted to have a higher usage frequency during game play as compared to secondary weapons and melee weapons. Exemplary primary weapons include, but are not limited to, submachine guns, carbines, rifles, and shotguns. Secondary weapons may include a predetermined group of ranged weapons that are predicted to have a higher usage frequency during game play as compared to melee weapons only. Exemplary secondary weapons include, but are not limited to, handguns and launchers. Melee weapons may include a predetermined group of edged weapons that are predicted to have a lowest usage frequency during game play as compared to primary and secondary weapons. Exemplary melee weapons include, but are not limited to, knives, daggers, and axes.

The interface 100 may be configured to display the weapons equipped by the avatar in a weapons-display region 140. The weapons are, for example, dynamically displayed on a plurality of selectable graphical elements (142, 144, 146, 148). Shown as non-limiting examples in FIGS. 1*a*-1*d*, the depicted weapons displayed on the selectable graphical elements (142, 144, 146, 148) correspond to a rifle 162, submachine gun 164, pistol 166, and dagger 168. Other types of weapons may also be displayed on the selectable graphical elements (142, 144, 146, 148). The plurality of selectable graphical elements (142, 144, 146, 148) may be operated by the user to perform weapon switching function and/or weapon reloading function.

In some embodiments, the weapons-display region 140 may be positioned in the heads-up display (HUD) area along the top of the display screen. For example, the weapons-display region 140 may be positioned in the upper right quadrant of the display screen. Positioning the weapons-display region 140 in other areas of the display screen may also be useful. In an alternative embodiment, the position of the weapons-display region 140 on the display screen may be user-defined. For example, the weapons-display region 140 is positioned according to user preference.

In some embodiments, the plurality of selectable graphical elements in the weapons-display region 140 includes a first orthogonal-shaped (e.g., rectangular-shaped) element 142 (hereinafter "current weapon panel") configured to dynamically display the weapon currently in use by the avatar. For example, the weapon displayed on the current weapon panel 142 is representative of an active weapon currently being used by the avatar. The user may operate the second input element 130 to perform an attack action pertaining to the active weapon, such as but not limited to shooting a projectile from a firearm (e.g., rifle, submachine gun, pistol) or thrusting a dagger. Shown as a non-limiting example in FIG. 1*a*, the active weapon may be a rifle 162.

In some embodiments, the plurality of selectable graphical elements in the weapons-display region includes a horizontally-arranged set of orthogonal-shaped (e.g., square-shaped) elements (144, 146, 148) disposed below the current weapon panel 142. Each of the second 144, third 146 and fourth 148 orthogonal-shaped elements (hereinafter "spare weapon panels") are configured to dynamically display the inactive weapons (or spare weapons) equipped by the avatar. The term "inactive weapon" refers to any weapon equipped by the avatar but is in an inactive state and is currently not in use by the avatar. For example, the weapon displayed on each of the spare weapon panels (144, 146, 148) is representative of an inactive weapon (or spare weapon) equipped by the avatar and available to be selected for use as the active weapon. Shown as non-limiting examples in FIG. 1*a*, the inactive weapons may be a submachine gun 164, pistol 166, and dagger 168.

Although three spare weapon panels (144, 146, 148) are shown in FIGS. 1*a*-1*d*, it is appreciated that the weapons-display region 140 may also be configured to include any number of spare weapon panels that is practicable. For example, the weapons-display region 140 may be configured to accommodate four, five, six, or more spare weapon panels to enable a corresponding number of spare weapons to be equipped by the avatar.

In some embodiments, each of the spare weapon panels (144, 146, 148) is assigned with a panel ranking value which reflects the significance and/or importance of the positioning of each spare weapon panel in the set. In other words, the panel ranking value can reflect how optimal or ideal the positioning of a particular spare weapon panel is. An optimally or ideally positioned spare weapon panel may be a panel that is easier to access (or operate) by a user relative to the other spare weapon panels in the set. For example, the leftmost (or rightmost) positioned spare weapon panel may be predetermined as the easiest and/or most convenient spare weapon panel for the user to select relative to the other spare weapon panels, and it is therefore assigned with a high panel ranking value. For example, it is predetermined that it would be easy for the user to perform a touching operation, or navigate a mouse, to select the leftmost spare weapon panel as the user would not need to be concerned with accidentally selecting any other spare weapon panel on the left of the leftmost spare weapon panel. In contrast, a spare weapon panel that is positioned between two other spare weapon panels may be predetermined as tedious and cumbersome to select, and is therefore assigned with a low panel ranking value.

The panel ranking values are used to define the order and/or position in which each of the spare weapon panels (144, 146, 148) is displayed in the weapons-display region 140. For example, the spare weapon panels (144, 146, 148) are arranged in order from the spare weapon panel having the highest predetermined panel ranking value to the spare weapon panel having the lowest predetermined panel ranking value.

Shown as non-limiting examples in FIGS. 1*a*-1*d*, the spare weapon panels (144, 146, 148) may be arranged from left to right in order of descending panel ranking values with the highest panel ranking value assigned to spare weapon panel 144 and the lowest panel ranking value assigned to spare weapon panel 148. The leftmost spare weapon panel 144 is, for example, predetermined as the most ideally (or optimally) positioned spare weapon panel because it is relatively easier to access (or operate) as there is no other selectable panel adjacent to the left and bottom side of the panel 144; and it is positioned closest to the centre of the display screen where the user's line of vision is presumed to mostly focus during game play. In comparison to the leftmost spare weapon panel 144, the middle spare weapon panel 146 is surrounded by other selectable panels (142, 144, 148) on three sides and is therefore predetermined to require a relatively higher degree of precision from the user to operate than spare weapon panel 144. The rightmost spare weapon panel 148 is, for example, predetermined as the least ideally (or optimally) positioned spare weapon panel because it is positioned furthest away from the centre of the display screen and would be the most difficult spare weapon panel to access when the user's line of vision is focused on the centre of the display screen. It is appreciated that the spare weapon panels (144, 146, 148) may also be arranged from right to left in order of descending panel ranking values depending on user preference.

In some embodiments, each weapon equipped by the avatar is assigned with a predicted weapon ranking value corresponding to a predicted relative likelihood that the particular weapon is selected for use as the active weapon during game play. For example, a first weapon is assigned with a higher predicted weapon ranking value relative to a second weapon when it is predicted that the first weapon is more likely to be selected for use as the active weapon than the second weapon. To further illustrate, the rifle 162 may be predicted as the most "likely used" weapon because it is a ranged weapon and it has the highest firepower compared to the other equipped weapons (e.g., submachine gun 164), thereby making the rifle 162 the most effective weapon in most combat scenarios. Other factors may also be used to determine the predicted weapon ranking value of each weapon. The predicted weapon ranking values may be used in conjunction with the panel ranking values of the spare weapon panels (144, 146, 148) to determine the order and/or position in which the inactive weapons are displayed on the spare weapon panels (144, 146, 148). The inactive weapons are, for example, dynamically displayed in order from the inactive weapon having the highest predicted weapon ranking value to the inactive weapon having the lowest predicted weapon ranking value.

In some embodiments, the inactive weapons are dynamically mapped (or associated) to the spare weapon panels (144, 146, 148) according to the panel ranking value of the spare weapon panels (144, 146, 148) and the predicted weapon ranking value of the inactive weapons. For example, the inactive weapon with the highest predicted weapon ranking value is mapped to the spare weapon panel with the highest panel ranking value, and the inactive weapon with the lowest predicted weapon ranking value is mapped to the spare weapon panel with the lowest panel ranking value. For example, the order of the spare weapon panels may determine the order of the inactive weapons (or spare weapons).

Shown as non-limiting examples in FIGS. 1a-1d, the rifle 162, submachine gun 164, pistol 166, and dagger 168 may be dynamically displayed on the spare weapon panels (144, 146, 148) from left to right in order of descending predicted weapon ranking values with the highest predicted weapon ranking value assigned to the rifle 162 and the lowest predicted weapon ranking value assigned to the dagger 168. As shown, the submachine gun 164 may be assigned with a higher weapon ranking value relative to the pistol 166 and dagger 168, and the pistol 166 may be assigned with a higher weapon ranking value relative to the dagger 168 only. In one embodiment, the leftmost spare weapon panel 144 may be assigned the highest panel ranking value and therefore it correspondingly displays sub-machine gun 164, which has the highest predicted weapon ranking value among the spare weapons; spare weapon panel 146 may be assigned the second highest panel ranking value and therefore it correspondingly displays pistol 166, which has the second highest predicted weapon ranking value among the spare weapons; and spare weapon panel 148 may be assigned the lowest panel ranking value and therefore it correspondingly displays dagger 168, which has the lowest predicted weapon ranking value among the spare weapons.

The graphical user interface as described herein advantageously optimizes the order and position of the spare weapons to allow the user to easily switch to the desired weapon in most instances even when the user has many (e.g., 3, 4, 5, or more) spare weapons to choose from as the invention will intuitively arrange the most "likely used" spare weapon in the optimal position to be selected by the user. Therefore, it does not matter how many spare weapon panels there are as the predictive nature of the invention results in the user's area of operations (or interactions) for performing both weapon switching and weapon reloading to being more or less reduced or confined to a specific (and smaller) area of the interface 100 a majority of time. For example, the majority of the time, the user would only be selecting the current weapon panel 142 and the adjacent spare weapon panel 144, and only on occasions be selecting the spare weapon panels 146 and 148. This maintains the robustness of the game play without compromising on the variety of the spare weapons.

Figure 1B:
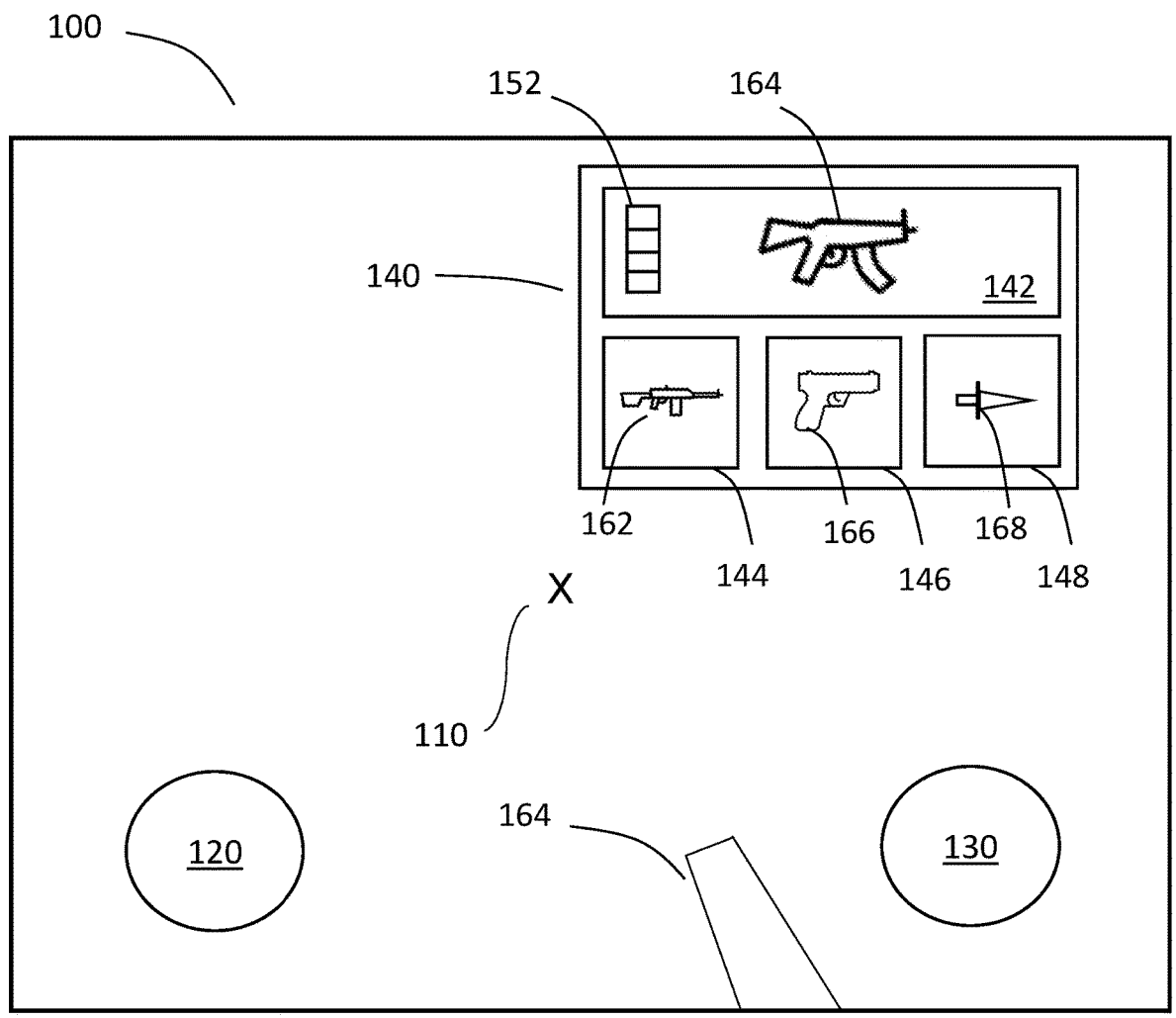
Figure 1C:
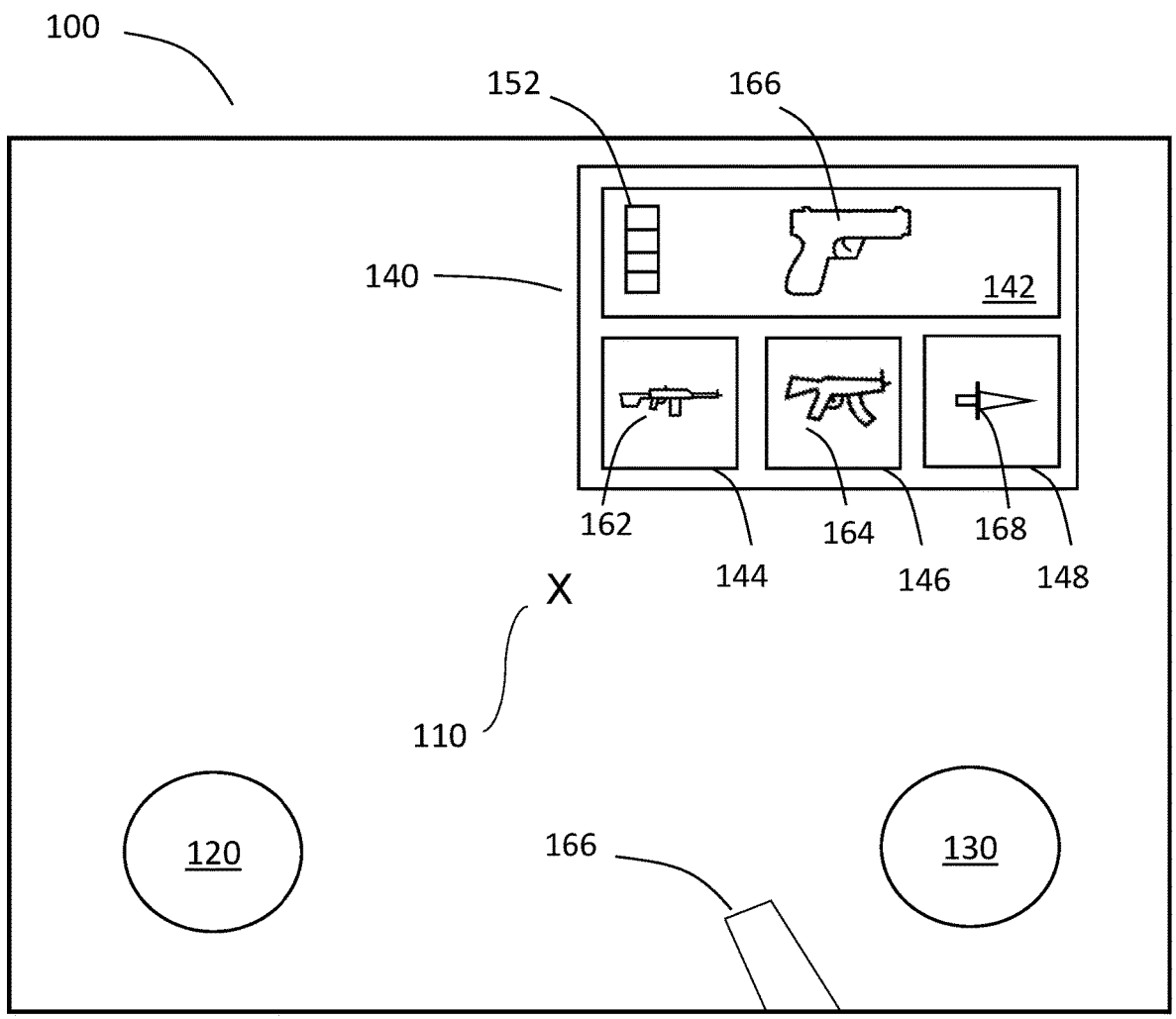

In some embodiments, the user may selectively operate the current weapon panel 142 to perform a weapon reloading function on any ranged weapons (or non-melee weapons). For example, the weapon reloading function reloads the ammunition 152 in the corresponding firearm displayed on the current weapon panel 142. When the weapon reloading function is performed, the amount of ammunition 152 in the corresponding displayed weapon may be increased up to a maximum capacity depending on an amount of spare ammunition (not shown) available for reloading. For example, in response to the user selectively operating the current weapon panel 142, the rifle 162 as depicted in FIG. 1a, in the submachine gun as depicted in FIG. 1b, or in the pistol as depicted in FIG. 1c, is reloaded with additional ammunition.

Figure 1D:
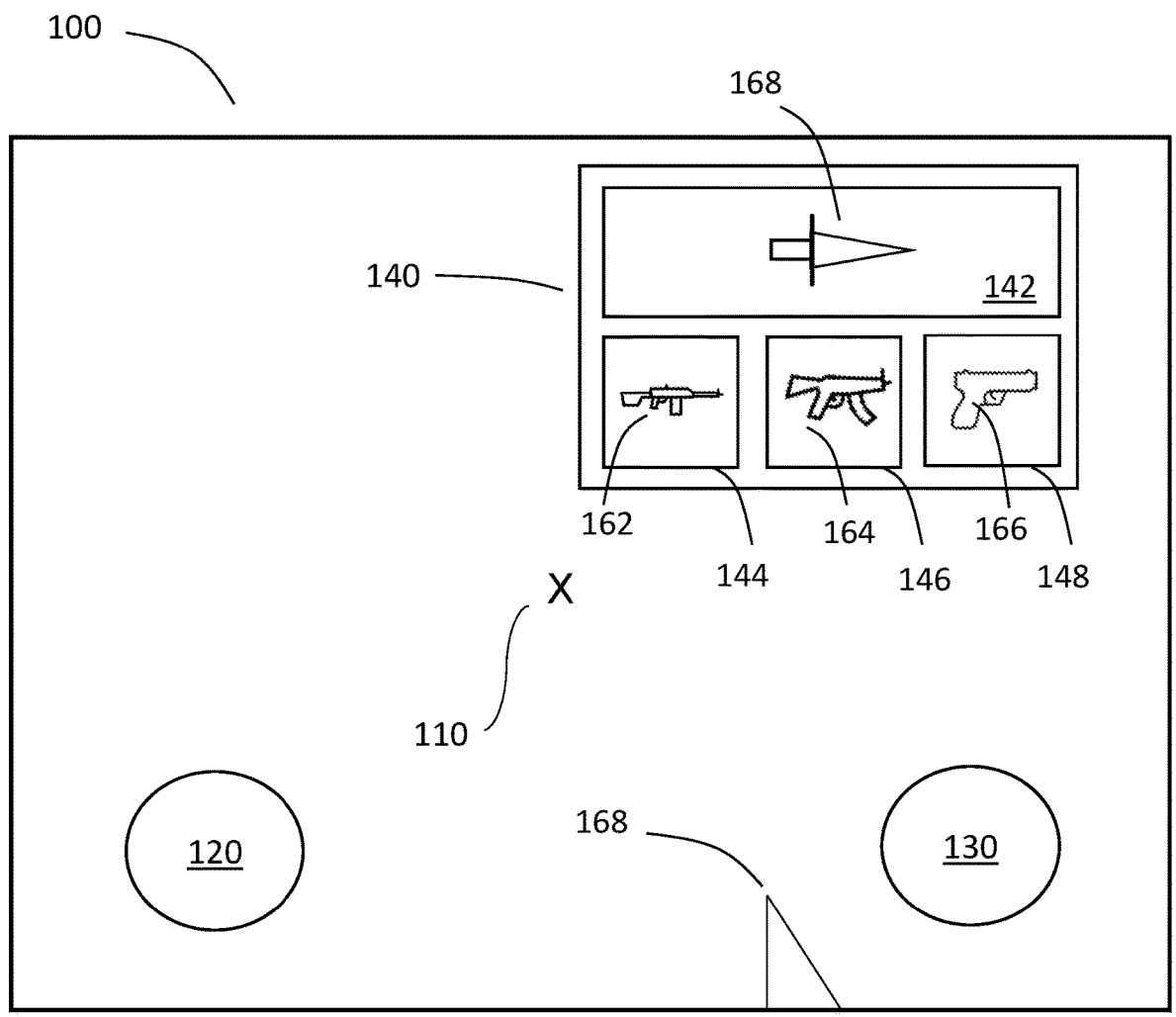

In some embodiments, the user may selectively operate any one of the spare weapon panels (144, 146, 148) to perform a weapon switching function that results in the corresponding weapon being designated as the active weapon. For example, the weapon switching function deselects the currently active weapon and selects the weapon displayed on the selected spare weapon panel as the active weapon in use by the avatar. When the weapon switching function is performed, the current weapon panel dynamically displays the corresponding weapon, which was displayed on the selected spare weapons panel, to reflect that the corresponding weapon is currently selected as the active weapon. For example, in response to the user selectively operating the spare weapon panel 144, the rifle 162 may be deselected as the active weapon and the current weapon panel 142 displays the submachine gun 164 to reflect that the submachine gun 164 is currently selected as the active weapon as depicted in FIG. 1b. In another embodiment, the user may selectively operate the spare weapon panel 146 to select the pistol 166 as the active weapon as depicted in FIG. 1c. In yet another embodiment, the user may selectively operate the spare weapon panel 148 to select the dagger 168 as the active weapon as depicted in FIG. 1d.

In some embodiments, each of the spare weapon panels (144, 146, 148) may be smaller in size than the current weapon panel 142, and is positioned adjacent to the current weapon panel 142. For example, the spare weapon panels (144, 146, 148) are horizontally arranged and positioned directly below the current weapon panel 142. Positioning the spare weapon panels (144, 146, 148) above the current weapon panel 142 may also be useful. The current weapon panel 142 is, for example, configured to extend horizontally along a length of the horizontally-arranged set of spare weapon panels (144, 146, 148) as depicted in FIGS. 1a-1d. In an alternative embodiment, the spare weapon panels (144, 146, 148) may be positioned in alignment with the current weapon panel 142. For example, the spare weapon panels (144, 146, 148) may be horizontally-arranged and aligned with respect to the current weapon panel 142 such that only the spare weapon panel with the highest panel ranking value is positioned adjacent to the current weapon panel 142.

Although the set of spare weapon panels (144, 146, 148) are depicted as horizontally-arranged, it is appreciated that the set of spare weapon panels (144, 146, 148) may also be vertically arranged and positioned directly to the left or right side of the current weapon panel 142. For example, the current weapon panel 142 may be configured to extend vertically along a length of the vertically-arranged spare weapon panels (144, 146, 148). Other practical configurations and arrangements of the current weapon panel 142 and spare weapon panels (144, 146, 148) are also contemplated.

Figure 2A:
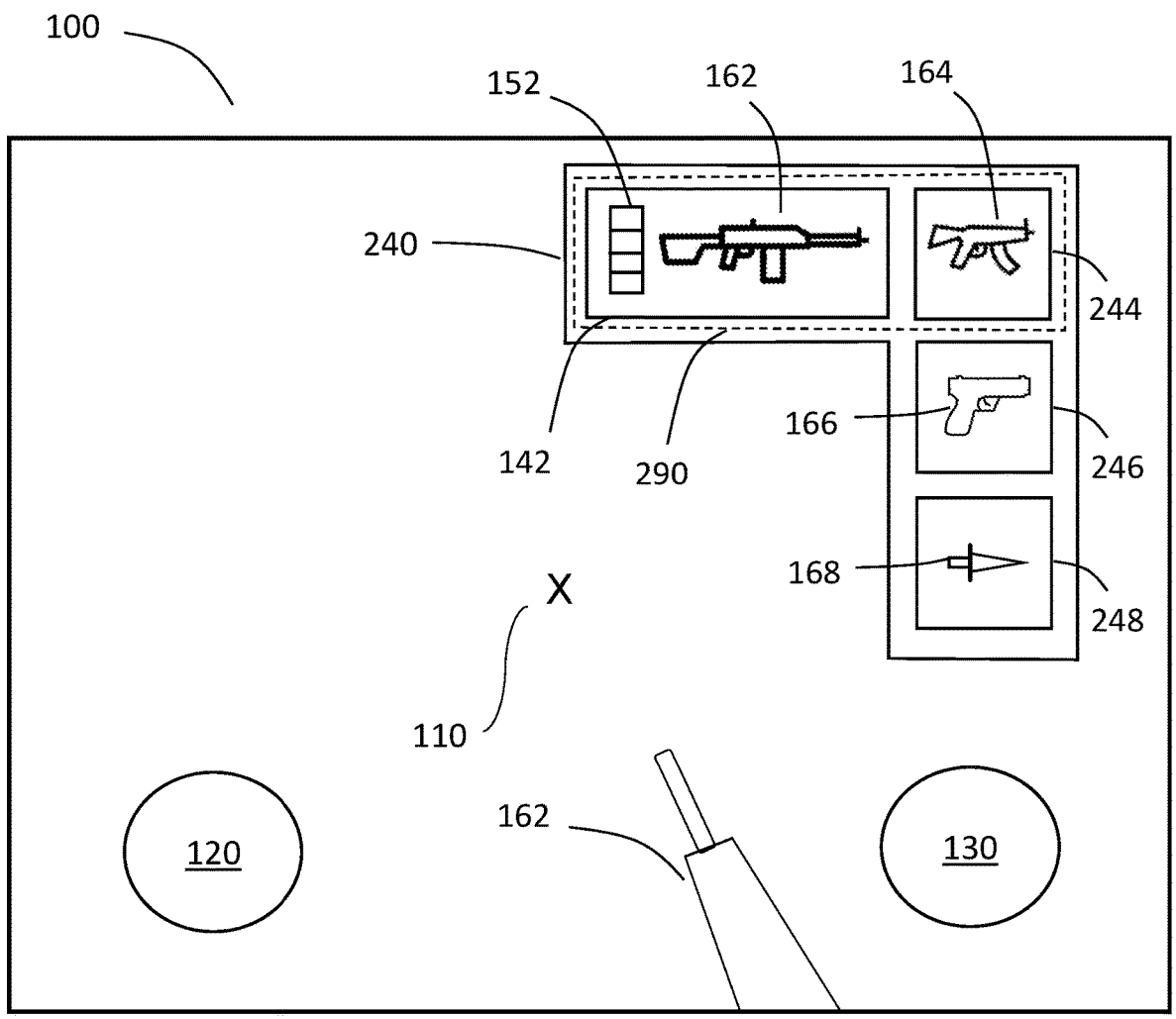
FIGS. 2a-2b show a graphical user interface rendered on a display screen of an electronic device, in accordance with certain alternative embodiments.
Figure 2B:
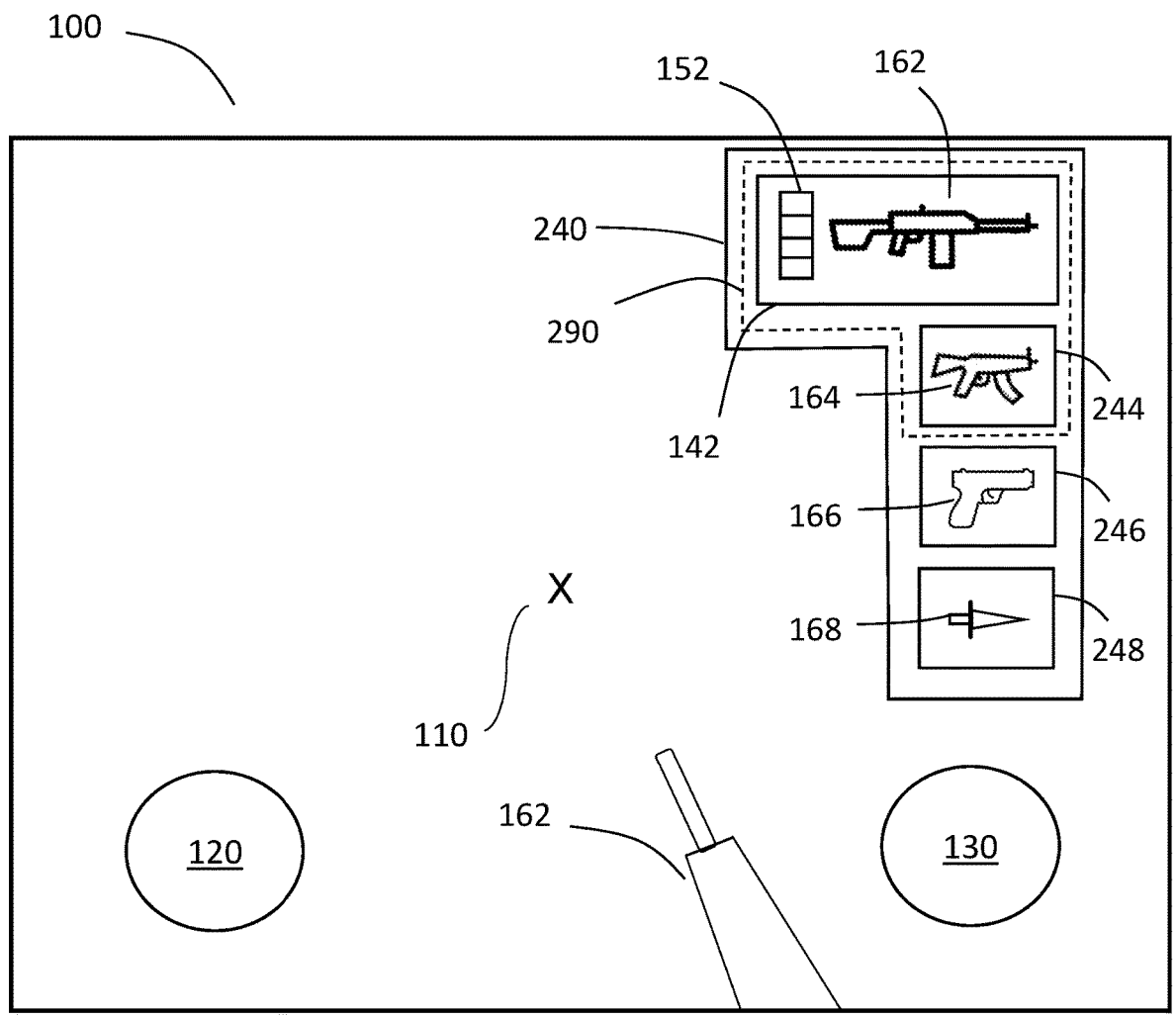

Continuing further, in FIGS. 2*a*-2*b*, there is shown an interface 100 in accordance with certain alternative embodiments. In the interest of brevity, elements having the same reference numerals may not be described in detail. Shown as an example, the interface 100 is configured to display the weapons equipped by the avatar in the weapons-display region 240. As aforementioned, the weapons may be dynamically displayed on a current weapon panel 142 and a set of vertically-arranged spare weapon panels (244, 246, 248).

In some embodiments, the current weapon panel 142 may be positioned adjacent to only one of the spare weapon panel of the set of spare weapon panels (244, 246, 248). Shown as non-limiting examples, the current weapon panel 142 may be positioned directly to the right side of the topmost spare weapon panel of the set of spare weapon panels (244, 246, 248) as depicted in FIG. 2*a*; or the current weapon panel 142 may be positioned directly above the topmost spare weapon panel of the set of spare weapon panels (244, 246, 248) as depicted in FIG. 2*a*.

In some embodiments, the spare weapon panel positioned closest to the current weapon panel 142 may be assigned with the highest panel ranking value. For example, the vertically-arranged spare weapon panels (244, 246, 248) may be arranged from top to bottom in order of descending panel ranking values with the highest panel ranking value assigned to spare weapon panel 244 and the lowest panel ranking value assigned to spare weapon panel 248. The topmost spare weapon panel 244 is, for example, predetermined as the most ideally (or optimally) positioned spare weapon panel because it is positioned closest to the current weapon panel 142, thereby allowing the user to operate within a small region (highlighted by the dashed box 290 around the current weapon panel 142 and spare weapon panel 244) of the interface 100 to perform both weapon switching and weapon reloading functions. This ties in with the previous mentioned advantage of reducing or confining the user's area of operations for performing both weapons switching and weapon reloading to a specific (and smaller) area of the interface 100 the majority of the time.

This is also particularly beneficial for users seeking to easily and quickly reload the most "likely used" weapon after switching to that weapon. To further illustrate, users can easily and quickly operate the current weapon panel 142 to reload, for example, the submachine gun 164 after operating the spare weapon panel 244 to select the submachine gun 164 as the active weapon. In comparison to the topmost spare weapon panel 244, the middle spare weapon panel 246 positioned relatively further away from the current weapon panel and thus requires more effort from the user to operate the current weapon panel 142 to reload, for example, the pistol 166 after operating the spare weapon panel 246 to select the pistol 166 as the active weapon. The bottommost spare weapon panel 248 is, for example, predetermined as the least ideally (or optimally) positioned spare weapon panel because it is positioned furthest away from the current weapon panel 142.

Although, a melee weapon is shown in spare weapon panel 248, it is not limited as such. The skilled person would appreciate that the bottommost spare weapon panel 248 may also display a primary or secondary weapon. For example, the bottommost spare weapon panel 248 may be associated to and display a handgun (not shown) having less firepower than the pistol 246, and therefore the handgun would assigned a lowest predicted weapon ranking value.

Figure 3:
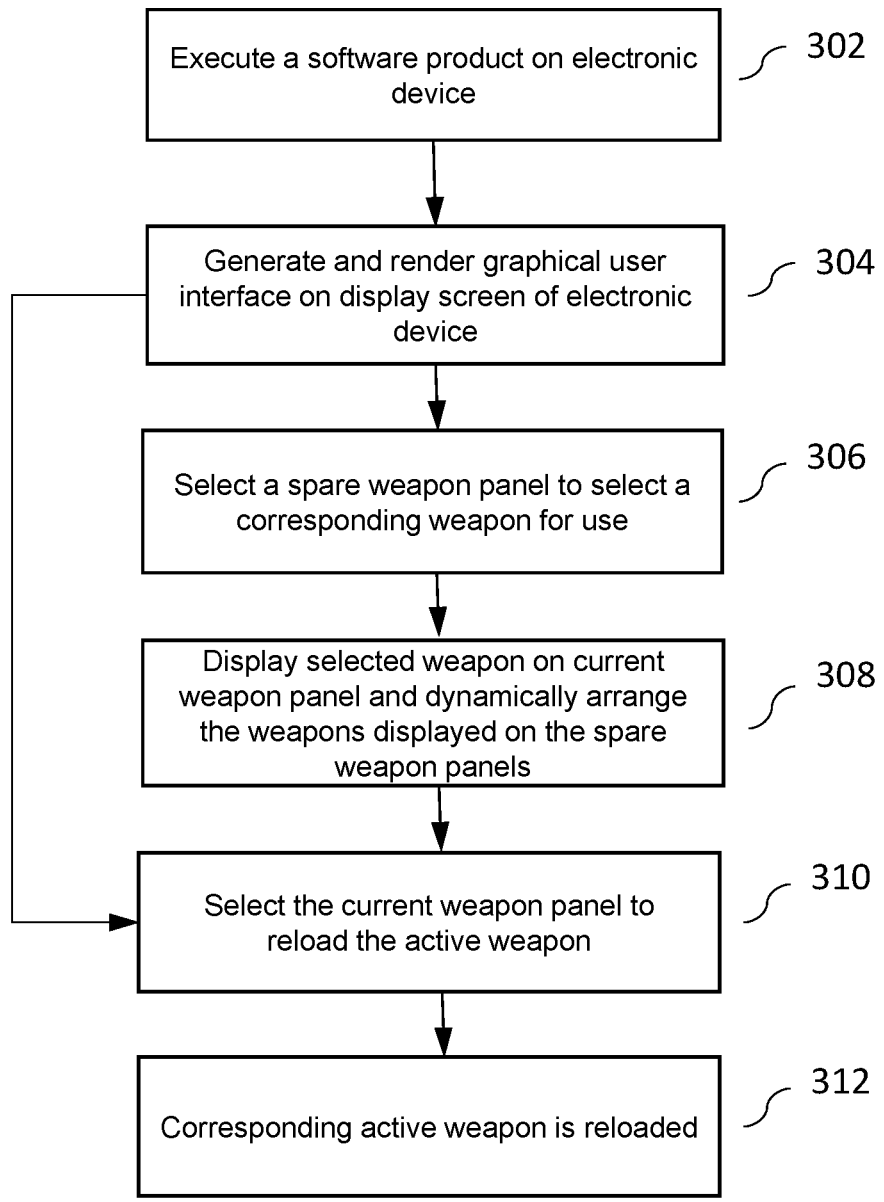
FIG. 3 is a flowchart showing a method of facilitating users with a graphical user interface, in accordance with the certain embodiments.

In FIG. 3, there is shown a flowchart describing a method for facilitating user interactions with a graphical user interface while playing a shooter game, in accordance with certain embodiments. The method is explained in conjunction with the interface 100 as described earlier through the previous figures of the disclosure. The steps identified in FIG. 3 are exemplary and may include various alternatives, equivalents, or derivations thereof including but not limited to the order of execution of the same. The steps of FIG. 3 (and its various alternatives) may be embodied in hardware or software including a computer-readable storage medium including instructions executable by the likes of a processor in a computing device. The exemplary method may be performed repeatedly during game play.

In step 302, the method executes a software product on computing hardware of an electronic device. In a non-limiting example, the electronic device can be any appropriate device incorporating a multi-touch sensitive screen, examples of which have been set forth earlier. Alternatively, the electronic device may also incorporate a traditional non-touch display screen. The software corresponds to a video game system, for facilitating playing of a game on the electronic device.

In step 304, as the software product is executed, the method includes generating and rendering on a graphical user interface a representation of the game environment on the display screen of the electronic device. In some embodiments, the game environment may be a game level or world associated with shooter games. For example, the game environment may be displayed from a game viewpoint relative to the user's avatar (e.g., first-person viewpoint or third-person viewpoint).

In some embodiments, the method includes presenting via the graphical user interface the selectable weapons equipped by the avatar in a weapons-display region. The selectable weapons are, for example, dynamically displayed on a plurality of selectable graphical elements displayed in the weapons-display region. The selectable weapons of the avatar includes a weapon in an active state (i.e., currently in user by the avatar) and a plurality of weapons in an inactive state (i.e., currently not in user by the avatar). In some embodiments, each selectable weapon equipped by the avatar is assigned with a predicted weapon ranking value corresponding to a predicted relative likelihood that the particular weapon is selected for use as the active weapon during game play. For example, a first weapon is assigned with a higher predicted weapon ranking value relative to a second weapon when it is predicted that the first weapon is more likely to be selected for use as the active weapon than the second weapon.

The plurality of selectable graphical elements may be operated by the user to perform weapon switching function and/or weapon reloading function. For example, as aforementioned, the plurality of selectable graphical elements includes a current weapon panel configured to dynamically display a first selectable weapon currently in use by the avatar, and a plurality of spare weapon panels configured to dynamically display the inactive weapons (or spare weapons) equipped by the avatar. In some embodiments, each of the spare weapon panels is assigned with a panel ranking value which reflects the significance and/or importance of the positioning of each spare weapon panel relative to other spare weapon panels in the weapon-display region. The plurality of spare weapon panels are, for example, arranged in accordance with the panel ranking values.

In some embodiments, the method continues to step 306 if the user selects a spare weapon panel from the plurality of spare weapon panels on the graphical user interface. In alternative embodiments, the method skips steps 306 and 308 and proceeds directly to step 310 if the user selects the selects the current weapon panel on the graphical user interface.

In step 306, the method includes the user selecting any one of the spare weapon panels corresponding to the different selectable inactive weapons that he/she may selectively make active for use by the avatar in the game environment.

Proceeding further to step 308, in response to the user selecting one of the spare weapon panels, the method includes switching the corresponding weapon (which was displayed on the selected spare weapon panel) from the inactive state to the active state, and promoting the corresponding weapon to the current weapon panel in place of the first selectable weapon to reflect that the corresponding weapon is currently selected for use in the game environment. At the same time, the first selectable weapon is switched to the inactive state and relegated to a spare weapon panel to reflect that the first selectable weapon is currently not in use and is therefore currently one of the weapons in the inactive state. Following the first selectable weapon's switch to the inactive state and/or relegation to a spare weapon panel, the weapons in the inactive state are dynamically ordered and displayed on the plurality of spare weapon panels according to the panel ranking value of the spare weapon panels and the predicted weapon ranking value of the current weapons in the inactive state.

In some embodiments, the method continues to step 310 if the user selects the current weapon panel after selecting a spare weapon panel.

In step 310, the method includes the user selecting the current weapon panel corresponding to the currently active weapon (e.g., active ranged weapon) for which he/she wants to perform the reloading function.

Proceeding further to step 312, in response to the user selecting the current weapon panel, the method includes increasing the amount of ammunition in the corresponding active weapon being displayed on the current weapon panel. For example, if the active weapon is a rifle that has fired off all its bullets, the user may select the current weapon panel to reload the rifle with more bullets and continue using the rifle thereafter.

The present invention may be implemented in a game that may be operable using a variety of devices or game systems. For example, a device may be a personal computer, a home entertainment system, a portable gaming device, or a mobile computing device. The present methodologies described herein are fully intended to be operable on a variety of devices or game systems. Any hardware platform suitable for performing the methodologies described here is suitable for use with the invention. Computer-readable storage media refer to any medium or media that participate in providing instructions to a CPU for execution. Such media can take many forms, such as but not limited to, non-volatile and volatile media including optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Unless specifically stated otherwise, and as apparent from the following, it will be appreciated that throughout the present specification, discussions utilizing terms such as "receiving", "identifying", 'initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A user interface for electronic games, the user interface comprising:
   a weapons-display region configured to display weapons of an avatar, each of the weapons capable of being in an active state or an inactive state, and being assigned with a predicted weapon ranking value corresponding to a predicted relative likelihood that the particular weapon will be selected for use, the weapons-display region comprising:
     a current weapon panel, wherein the current weapon panel is configured to display a first weapon of the weapons in an active state, and
     a plurality of spare weapon panels, wherein each of the plurality of spare weapon panels being assigned with a panel ranking value and configured to display one of the weapons in the inactive state at any one time to reflect that the displayed weapon is not currently in use, the panel ranking value reflecting a significance or importance of a positioning of each spare weapon panel relative to other spare weapon panels in the weapons-display region, the plurality of spare weapon panels being arranged in accordance with the panel ranking values; and
   wherein selection of any one of the spare weapon panels results in
     a corresponding weapon in the inactive state, which is displayed on the selected spare weapon panel, being switched to the active state and promoted to the current weapon panel in place of the first weapon to reflect that the corresponding weapon is currently in use, the first weapon being switched to the inactive state and relegated to a spare weapon panel, and the weapons in the inactive state, including the relegated first weapon, being dynamically ordered and displayed on the plurality of spare weapon panels according to the panel ranking value of the spare weapon panels and the predicted weapon ranking value, wherein the corresponding weapon currently in use is not displayed on the plurality of spare weapon panels.

2. The user interface of claim 1, wherein the current weapon panel is positioned adjacent to at least one of the plurality of spare weapon panels.

3. The user interface of claim 1, wherein the current weapon panel is positioned adjacent to and directly above each of the plurality of spare weapon panels.

4. The user interface of claim 1, wherein the weapon in the inactive state assigned with the highest predicted weapon ranking value is mapped to the spare weapon panel assigned with the highest panel ranking value.

5. The user interface of claim 1, wherein the weapon in the inactive state assigned with the lowest predicted weapon ranking value is mapped to the spare weapon panel assigned with the lowest panel ranking value.

6. The user interface of claim 1, wherein selection of the current weapon panel results in the weapon displayed on the current weapon panel being reloaded with ammunition.

7. The user interface of claim 6, wherein the current weapon panel is positioned adjacent to the spare weapon panel assigned with the highest panel ranking value, thereby confining a user's area of operation for performing both weapon switching and weapon reloading functions to a small area of the user interface when the spare weapon panel assigned with the highest panel ranking value is selected.

8. The user interface of claim 1, wherein a higher panel ranking value of the spare weapon panel reflects a greater accessibility of the spare weapon panel.

9. The user interface of claim 1, wherein a higher panel ranking value of the spare weapon panel reflects a closer proximity of the spare weapon panel to the current weapon panel.

10. The user interface of claim 1, wherein the weapons of the avatar comprises at least one primary weapon, at least one secondary weapon, and at least one melee weapon.

11. The user interface of claim 10, wherein the at least one primary weapon is assigned with a higher predicted weapon ranking value relative to the at least one secondary weapon and the at least one melee weapon.

12. The user interface of claim 11, wherein the at least one secondary weapon is assigned with a higher predicted weapon ranking value relative to the at least one melee weapon.

13. The user interface of claim 1, wherein the weapons-display region comprises more than two spare weapon panels.

14. The user interface of claim 1, wherein the user interface is a graphical user interface rendered and presented on a touch-sensitive display screen of an electronic device.

15. A system comprising one or more computers and one or more storage devices storing computer-readable instructions that, when executed by the one or more computers, cause the one or more computers to generate and render the user interface of claim 1.

16. One or more non-transitory computer storage media storing instructions that, when executed by one or more computers, cause the one or more computers to generate and render the user interface of claim 1.

* * * * *